2,906,756

NEW ORGANIC SILICON COMPOUNDS AND METHODS OF MAKING THEM

Peter L. de Benneville, Philadelphia, and Marvin J. Hurwitz, Elkins Park, Pa., assignors to Rohm & Haas Company, Philadelphia, Pa., a corporation of Delaware No Drawing. Original application June 1, 1955, Serial No. 512,572. Divided and this application October 24, 1956, Serial No. 617,937

18 Claims. (Cl. 260—309.7)

This invention concerns the production of new organic silicon-containing compounds and novel methods of producing them. This application is a division of our co-pending application Serial No. 512,572, filed June 1, 1955.

In accordance with the present invention, the starting compounds for carrying out the reactions are amino-silanes which generally have the structure of Formula I:

I    $(R^0)_{4-x}Si(-NR'R'')_x$ where $R^0$ is a cyclohexyl group, an aryl group, especially phenyl, an alkenyl group, especially vinyl, allyl or cyclohexenyl, or an alkyl group having 1 to 18 carbon atoms, and especially an alkyl of 1 to 4 carbon atoms (groups $R^0$ may be the same or different when I contains a plurality thereof), R' and R'' together may be the morpholino residue $=(CH_2CH_2)_2O$, the piperidino residue $-(CH_2)_5-$, or the pyrrolidino residue $-(CH_2)_4-$, or separately R' may be cyclohexyl, phenyl, aralkyl, especially benzyl, or an alkyl group having 1 to 18 carbon atoms, R'' may be hydrogen, cyclohexyl, aralkyl, especially benzyl, or an alkyl group having 1 to 18 carbon atoms, the total of carbon atoms in R' and R'' together being no greater than 18, with the proviso that when R' is an alkyl group containing a tertiary carbon atom attached to the nitrogen atom, then R'' must be H, and x is an integer having a value of 1 to 4.

Throughout the specification and claims, the symbols above are used with the same meaning as defined above.

The compounds within the scope of Formula I are in many cases known and are generally liquids at normal temperatures. Generally, the entire group can be made by reacting at low temperatures of 0° to 50° C., preferably 0° to 5° C., the corresponding mono-, di-, tri-, or tetra-chlorosilane or hydrocarbon-substituted chlorosilane with an appropriate amine of the formula NHR'R'' under anhydrous conditions, optionally in the presence of an inert organic solvent, such as benzene. Excess amine or additional tertiary amine, such as triethylamine, is provided to accept the hydrogen chloride liberated in the reaction and form the corresponding amine salt which may be removed by filtration. The filtrate is stripped of solvent, if any, and the product of Formula I is distilled.

According to the present invention, it has been found that compounds of Formula I react rapidly with ureas and carbamates containing reactive hydrogen. The reaction is apparently an equilibrium reaction involving the interchange of the amino group or groups —NR'R'' and the residue Z (representing all but the reactive hydrogen atom) of the reactive hydrogen-containing urea or carbamate according to the following equation illustrating the reaction between a monoaminosilane of Formula I with the monofunctional compound ZH containing the reactive hydrogen;

$(R^0)_3SiNR'R'' + ZH \rightleftarrows (R^0)_3SiZ + NHR'R''$

To shift the equilibrium to the right, it is merely necessary that the amine NHR'R'' be removed. This can be done simply by volatilization thereof provided the amine NHR'R'' corresponding to the group —NR'R'' in the silyl amine has a substantially lower boiling point than the compound ZH. The reaction may be performed either with or without an inert organic solvent, such as benzene, toluene, xylenes, solvent naphthas, but in any event anhydrous conditions should be maintained. The temperatures may range from 10° up to 180° C. or so, generally being effected at, or approximately at the boiling point of the amine to be liberated. One reactant may be added to the other gradually to facilitate proper control of the temperature, but this is not always necessary, depending on the particular reactants ZH and of Formula I.

Because of the simplicity of removing the displaced amine by volatilization, this process is highly advantageous for producing the new compounds described hereinafter.

The advantage of the process of the present invention lies in the fact that by merely warming or heating the two reactants (ZH and a compound of Formula I), an amine is released and the condensation is effected. Since no acidic material, such as HCl, is released (as in the method described hereinafter using chlorosilanes or the like), there is no acid-catalyzed degradation of the products, and there is no material present other than the condensation product (such as an amine hydrochloride where an amine is used as an HCl acceptor). The yields are higher in the new process than when chlorosilanes are used.

Generally, the most useful starting compounds of Formula I are those in which the amino group or groups —NR'R'' correspond to the lower primary or secondary alkyl amines such as methylamine, dimethylamine, ethylamine, diethylamine, propylamine, dipropylamine, isopropylamine, or t-butylamine. These amines have boiling points of about 56° C. or below. However, when the reactive hydrogen-containing compound ZH is one which requires a higher reaction temperature, the compounds of Formula I may contain groups —NR'R'' corresponding to amines NHR'R'' of higher boiling point provided it is substantially lower than the boiling point of the compound ZH. The higher boiling primary and secondary amines may be used, such as t-amylamine, hexylamine, cyclohexylamine, t-octylamine, decylamine, octadecylamine, morpholine, piperidine, pyrrolidine, aniline, and benzylamine.

The new compounds of the invention are obtained by reacting a urea or a carbamate with a compound of Formula I. The new products obtained from a non-cyclic urea are those having the structure of Formula VII:

VII

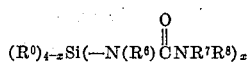

where $R^6$ is hydrogen, benzyl, or an alkyl or alkenyl group of 1 to 18 carbon atoms, $R^7$ is H or phenyl, or alkyl of 1 to 4 carbon atoms, and $R^8$ is H, phenyl, benzyl, or alkyl of 1 to 4 carbon atoms.

These compounds are obtained when urea or substituted ureas of non-cyclic character are used as the starting materials, such as urea, N-methylurea, N-ethylurea, N-phenylurea, N,N'-diethylurea, N,N'-dimethylurea, or N,N,N'-trimethylurea.

Another group has the structure of Formula VIII:

VIII

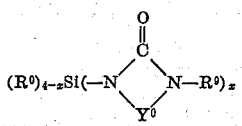

where $R^9$ is hydrogen, phenyl, benzyl, cyclohexyl, or an alkyl group having 1 to 8 carbon atoms, and $Y^0$ is an alkylene group of 2 to 18 carbon atoms, of which 2 to 3 thereof extend in a chain between the adjoined nitrogen atoms.

They are obtained by reacting compounds of Formula I with cyclic ureas, which may also be called 2-imidazolidinones and hexahydropyrimidinones, such as N,N'-ethyleneurea, N,N'-trimethyleneurea, N-methyl-N,N'-ethyleneurea, and N-phenyl-N,N'-ethyleneurea.

In some cases, when two equivalents of the silylated amine are used in the reaction, as in the reaction of N,N'-ethyleneurea with $(R^0)_3SiNR'R''$, there may also be obtained, in addition to a relatively small proportion of a monosubstituted compound of Formula VIII, a relatively large proportion of disubstituted compounds of Formula VIIIb:

VIIIb

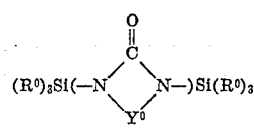

When the reaction is effected between N,N'-ethyleneurea and a compound of Formula I in which $x$ is greater than 1, polymeric condensation products are obtained which are linear except when $x$ is 3 or 4, in which event they are of three-dimensional type.

The ureido-compounds of Formulas VII, VIII, and VIIIb are generally solids. They may be applied to paper which, on heating to 230° to 300° F. for ½ to 5 minutes, as on calendaring cylinders, has its water-absorption characteristics greatly reduced and shows increased wet-strength. When one or more of groups $R^6$, $R^7$, and $R^8$ are relatively large so that their carbon atom total is 8 or more, the paper is water-repellent and acquires a waxy surface feel when 3 to 5% of the product is incorporated, based on the dry pulp weight of the paper. The compounds may also be applied to fabrics of cotton, rayon, zein, casein, or the like to reduce shrinkage, to crease-proof, to crush-proof, and to modify their moisture-absorption and dyeing characteristics. Application may also be made to non-fibrous sheets of cellophane, polyethylene terephthalate and to fabrics of nylon and Dacron (polyethylene terephthalate), for increasing water-repellency, reducing shinkage, and/or modifying the feel of the surface, such as to provide a waxy, lubricous surface thereon. In all cases, the treated material should be heated to 230° to 300° F. or higher for several minutes to a half-hour to insolubilize the composition applied in situ on the fabric, sheet, or the like.

When a compound of Formula I is reacted with a carbamate containing a reactive hydrogen on the nitrogen atom, the new derivatives that are obtained have the structure of Formula IX:

IX

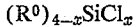

where $R^{10}$ is an aryl group, such as phenyl, tolyl, xylyl, an aralkyl group, such as benzyl, or an alkyl or alkenyl group having 1 to 18 carbon atoms.

The carbamates that may be so reacted include urethane, ethyl N-methylcarbamate, methyl N-benzylcarbamate, isopropyl carbamate, ethyl N-n-octylcarbamate, ethyl N-octadecylcarbamate, dodecenyl carbamate, phenyl carbamate, tolyl carbamate, and benzyl N-methylcarbamate.

These products include high-boiling liquids and solids. They are soluble in aromatic hydrocarbons, such as toluene, benzene, xylene. They may be applied to paper and heated to 230° to 300° F. for ½ to 5 minutes or more to reduce the water-absorptivity of the paper and increase the wet-strength thereof. When one or more of groups $R^6$ and $R^{10}$ are relatively large so that their carbon atom total is 8 or more, the paper is water-repellent and acquires a waxy surface feel when 3 to 5% of the product is incorporated, based on the dry pulp weight of the paper. The compounds may also be applied to fabrics of cotton, rayon, zein, casein, or the like to reduce shrinkage, to crease-proof, to crush-proof, and to modify their moisture-absorption and dyeing characteristics. Application may also be made to non-fibrous sheets of cellophane, polyethylene terephthalate and to fabrics of nylon and Dacron (polyethylene terephthalate), for increasing water-repellency, reducing shrinkage, and/or modifying the feel of the surface, such as to provide a waxy, lubricous surface thereon. In all cases, the treated material should be heated to 230° to 300° F. or higher for several minutes to a half-hour to insolubilize the composition applied in situ on the fabric, sheet, or the like.

The new compounds may also be obtained by reacting the reactive hydrogen-containing urea or carbamate with a chlorosilane of Formula Id:

Id  $(R^0)_{4-x}SiCl_x$ where the symbols have the same definitions as before.

The reaction is effected in the presence of a tertiary amine, such as trimethylamine, triethylamine, pyridine or quinoline, as an acceptor for the hydrogen chloride developed by the reaction. The reaction may be effected at a temperature of about $-20°$ C. to room temperature, preferably between $-5°$ and $+10°$ C. The reaction is preferably carried out in an anhydrous solvent, such as benzene, toluene or xylenes, or one of the tertiary amines above. The reaction is rapid and exothermic and, therefore, it is preferred to add one of the reactants or a solution of one of the reactants to the other reactant or to a solution thereof in one of the anhydrous solvents mentioned above at a rate that is sufficiently slow to enable proper control of the temperature by cooling means. Generally, the reaction is complete at the end of the addition of one reactant to the other. Sufficient excess of amine or sufficient tertiary amine should be added to take up all of the hydrogen chloride liberated and preferably an excess over this amount is used.

For reasons pointed out hereinabove, however, the use of an amino-silico-compound of Formula I as the starting material for making these new compounds is distinctly advantageous. In some cases, especially in the making of the new compounds from ureas, the compounds of Formula Id either do not react or they produce a complex mixture containing by-products which is of such a character that isolation of the desired product is practically impossible.

ILLUSTRATIVE PREPARATION OF COMPOUNDS OF FORMULA I

*Example A*

A solution is made of 365 parts of t-butylamine in 600 parts of benzene. There is added dropwise to this solution, at 0° to 5° C., a solution of 217 parts of trimethylchlorosilane in 600 parts of dry benzene. After addition is completed, the reaction mixture is filtered and the solid residue washed with dry benzene. The benzene solutions are distilled and the product, trimethyl-t-butylaminosilane, boiling at 118° to 127° C., $n_D^{25}$ 1.4060 is used in the subsequent reactions. It analyzes 9.7% nitrogen (9.6% theoretical).

In similar fashion, when dry diethylamine is substituted for the t-butylamine, there is obtained trimethyl-(diethylamino)-silane in the fraction boiling in the range of 125° to 127° C., $n_D^{25}$ 1.4105, and containing by analysis 9.7% N (theory 9.6%).

To a solution of 39 parts of benzylamine and 60 parts of triethylamine in 300 parts of benzene is added at 0° to 5° C. 40 parts of trimethylchlorosilane. Benzylaminotrimethylsilane, isolated as in the preceding examples in a fraction boiling at 95° to 96° C. at 15 mm. of mercury, 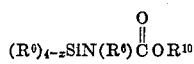 1.4918 (percent N, 7.9 found, 7.8 calculated).

By similar methods, there are prepared 1,1,3,3-tetramethylbutylaminotrimethylsilane, obtained in a fraction having a boiling range of 190° to 195° C., and trimethylsilylaniline, in a fraction having a boiling range of 92° to 93° C. at 12 mm. of mercury.

The following examples are illustrative of the invention, parts given being by weight unless otherwise noted:

Example 1

A mixture of 34 parts of t-butylaminotrimethylsilane and 6.6 parts of urea is heated at 110° C. for 12 hours during which 7 parts of t-butylamine is removed. The excess silane is distilled and the solid residue is sublimed to yield 30 parts (89% yield) of product, N-trimethylsilylurea, M.P. 160° to 171° C. *Analysis.*—Found: C, 36.6%, H, 9.2%, N, 20.9%. Theory: C, 36.4%, H, 9.1%, N, 21.2%.

Example 2

To 8.6 grams (0.1 mole) of crystallized ethyleneurea there is added 70 cc. of benzene and this slurry is refluxed for two hours using a water separator. The slurry is cooled to room temperature and 29 grams (0.216 mole) of t-butylaminotrimethylsilane is added. After two hours of heating the solution at 75° C., evolution of t-butylamine is complete. The benzene is stripped under reduced pressure leaving 20 grams of crude solid. This solid is fractionally crystallized from anhydrous ether to yield 16.5 grams of a solid product (*a*), N,N'-bis-(trimethylsilyl)-N,N'-ethyleneurea having a melting point of 67° to 68.5° C. and a nitrogen content of 12.4% as compared with 12.2% theoretical value. Another fraction (1.5 grams) is essentially a solid product (*b*), N-trimethylsilyl-N,N'-ethyleneurea, having a M.P. of 118° to 120° C. and an analysis of C, 45.7%; H, 8.9%, N, 17.9%. The calculated values are: C, 45.6%, H, 8.9%, N, 17.7%.

Both solids are soluble but to different extents in benzene and ether.

A 10% solution of solid (*a*) in toluene is sprayed on paper as it proceeds over, and approaches the end of, the series of drying drums of a paper-making machine. The finished paper has reduced moisture absorption and increased wet strength.

Example 3

A 13.2 grams (0.15 mole) batch of N,N'-dimethylurea is refluxed as a slurry with 90 cc. of benzene for two hours using a water separator. After cooling the benzene slurry to room temperature, there is added 45 grams (0.31 mole) of t-butylaminotrimethylsilane. After five hours of heating at 74° to 85° C., 10.5 grams of t-butylamine is distilled and substantially no more amine is evolved thereafter. The benzene is stripped and 25.0 grams (85% yield) of crude N-trimethylsilyl-N,N'-dimethylurea is obtained as a solid. The solid is purified by sublimation at 1 mm. Hg pressure and 70° C. to give a product having a M.P. of 77° to 79° C.

The product above is soluble in both benzene and ether.

A cotton fabric is passed through a 10% solution of the product in toluene. On drying and heating to 150° C. for ten minutes, the fabric obtained is characterized by a pleasing hand and improved resistance to moisture, staining, and wrinkling.

Example 4

(*a*) A mixture is made of 365 parts of urethane (ethyl carbamate) in 1500 parts of dry benzene. This solution is refluxed for two hours using a water separator to remove any water introduced with the urethane. To the cooled benzene solution is added 710 parts of triethylamine, and the mixture is cooled to 5° C. There is then added at such a rate as to maintain a temperature of less than 20° C., a solution of 440 parts of trimethylchlorosilane in 400 parts of dry benzene. At the completion of the addition, the reaction mixture is heated to 80° C., and filtered to remove triethylamine hydrochloride, the precipitate being washed with hot dry benzene. The combined filtrate and extracts are then distilled to yield 340 parts of ethyl N-trimethylsilylcarbamate, a colorless liquid, in the fraction boiling in the range of 170° to 175° C., $n_D^{25}$ 1.4184.

(*b*) The same compound as that produced in part (*a*) is obtained by the following procedure: The mixture of 21 parts of urethane in 100 parts of benzene is azeotroped with benzene to remove any water in the urethane. The benzene is then removed by stripping, and to the dried solid is added 44 parts of N-(trimethylsilyl)-t-butylamine. After about twelve hours of heating at 100° C., the mixture is cooled, anhydrous ether is added and any solid formed is removed by filtration. The filtrate is distilled to give a liquid boiling at 172° to 175° C., $n_D^{25}$ 1.4184, which is identical with the product obtained from the chlorosilane.

A wool fabric is passed through a 10% solution of the product in toluene. After drying, it is heated to 80° C. for one-half hour. The fabric is characterized by improved resistances to moisture and staining, and by reduced shrinkage on washing.

It is to be understood that changes and variations may be made without departing from the spirit and scope of the invention as defined in the appended claims.

We claim:

1. As a new composition of matter, a compound selected from the class consisting of those having the Formulas VII, VIII, VIII*b*, and IX following:

VII

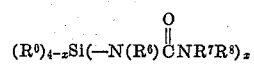

VIII

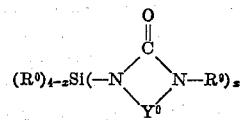

VIII*b*

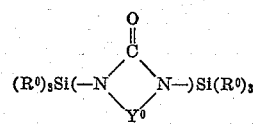

and

IX

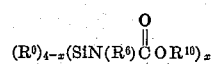

where $R^0$ is selected from the group consisting of cyclohexyl, cyclohexenyl, alkenyl, and alkyl groups having 1 to 18 carbon atoms, $R^6$ is selected from the group consisting of hydrogen, benzyl, and alkyl and alkenyl groups having 1 to 18 carbon atoms, $R^7$ is selected from the group consisting of hydrogen, phenyl, and alkyl groups having 1 to 4 carbon atoms, $R^8$ is selected from the group consisting of hydrogen, phenyl, benzyl, and alkyl groups having 1 to 4 carbon atoms, $R^9$ is selected from the group consisting of hydrogen, phenyl, benzyl, cyclohexyl, and alkyl groups having 1 to 8 carbon atoms, $R^{10}$ is selected from the group consisting of aryl, aralkyl, and alkyl and alkenyl groups having 1 to 18 carbon atoms, $Y^0$ is an alkylene group having 2 to 18 carbon atoms, of which 2 to 3 thereof extend in a chain between the adjoined nitrogen atoms, and $x$ is an integer having a value of 1 to 4.

2. As a new composition of matter, a compound having the formula

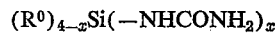

where $R^0$ is an alkyl group having 1 to 4 carbon atoms, and $x$ is an integer having a value of 1 to 4.

3. As a new composition of matter, a compound having the Formula VIII of claim 1 in which $R^0$ is an alkyl group having 1 to 4 carbon atoms, $Y^0$ is ethylene, and $R^9$ is hydrogen.

4. As a new composition of matter, a compound having the Formula VIIIb of claim 1 in which $R^0$ is an alkyl group having 1 to 4 carbon atoms, and $Y^0$ is ethylene.

5. As a new composition of matter, a compound of the class having the formula

IX
$$(R^0)_{4-x}Si(N(R^6)\overset{\overset{O}{\|}}{C}OR^{10})_x$$

where $R^0$ is selected from the group consisting of cyclohexyl, cyclohexenyl, alkenyl, and alkyl groups having 1 to 18 carbon atoms, $R^6$ is selected from the group consisting of hydrogen, benzyl, and alkyl and alkenyl groups having 1 to 18 carbon atoms, $R^{10}$ is selected from the group consisting of aryl, aralkyl, and alkyl and alkenyl groups having 1 to 18 carbon atoms, and $x$ is an integer having a value of 1 to 4.

6. N-trimethylsilylurea.
7. N-trimethylsilyl-N,N'-ethyleneurea.
8. N,N'-bis-(trimethylsilyl)-N,N'-ethyleneurea.
9. N-trimethylsilyl-N,N'-dimethylurea.
10. Ethyl N-trimethylsilylcarbamate.

11. The method for producing silicon-containing organic compounds which comprises reacting a compound selected from the group consisting of ureas, carbamates, and cyclic ureas, containing a reactive hydrogen atom with a silicon-containing compound having the formula:

$$(R^0)_{4-x}Si(-NR'R'')_x$$

where $R^0$ is selected from the group consisting of cyclohexyl, cyclohexenyl, alkenyl and alkyl groups having 1 to 18 carbon atoms, $x$ is an integer having a value of 1 to 4, R' and R'' are selected from the group consisting of radicals directly attached only to the adjoining nitrogen atom and radicals which together and with the adjoining nitrogen atom form a heterocyclic nucleus from the group consisting of the morpholino residue $=(CH_2CH_2)O$, the piperidino residue $-(CH_2)_5-$, and the pyrrolidino residue $-(CH_2)_4-$, R', when directly attached only to the adjoining nitrogen atom, being selected from the group consisting of cyclohexyl, phenyl, aralkyl, and alkyl groups having 1 to 18 carbon atoms, and R'', when directly attached only to the adjoining nitrogen atom, being selected from the group consisting of hydrogen, cyclohexyl, aralkyl, and alkyl groups having 1 to 18 carbon atoms, the total of carbon atoms in R' and R'' together being no greater than 18, with the proviso that when R' is an alkyl group containing a tertiary carbon atom attached to the nitrogen atom, R'' is H.

12. A method as defined in claim 11 in which the reaction is carried out at a temperature between 10° and about 180° C.

13. A method as defined in claim 11 in which the reaction is carried out in an inert organic solvent at a temperature between 10° and about 180° C.

14. A method as defined in claim 11 in which the reaction is carried out in an inert organic solvent at a temperature between 10° and about 180° C. while distilling off the amine NHR'R'' formed.

15. The method for producing silicon-containing organic compounds which comprises reacting a carbamate containing a reactive hydrogen atom with a silicon-containing compound having the formula:

$$(R^0)_{4-x}Si(-NR'R'')_x$$

where $R^0$ is selected from the group consisting of cyclohexyl, cyclohexenyl, alkenyl and alkyl groups having 1 to 18 carbon atoms, $x$ is an integer having a value of 1 to 4, R' and R'' are selected from the group consisting of radicals directly attached only to the adjoining nitrogen atom and radicals which together and with the adjoining nitrogen atom form a heterocyclic nucleus from the group consisting of the morpholino residue $$=(CH_2CH_2)O,$$

the piperidino residue $-(CH_2)_5-$, and the pyrrolidino residue $-(CH_2)_4-$, R', when directly attached only to the adjoining nitrogen atom, being selected from the group consisting of cyclohexyl, phenyl, aralkyl, and alkyl groups having 1 to 18 carbon atoms, and R'', when directly attached only to the adjoining nitrogen atom, being selected from the group consisting of hydrogen, cyclohexyl, aralkyl, and alkyl groups having 1 to 18 carbon atoms, the total of carbon atoms in R' and R'' together being no greater than 18, with the proviso that when R' is an alkyl group containing a tertiary carbon atom attached to the nitrogen atom, R'' is H.

16. A method as defined in claim 15 in which the reaction is carried out at a temperature between 10° and about 180° C.

17. A method as defined in claim 15 in which the reaction is carried out in an inert organic solvent at a temperature between 10° and about 180° C.

18. A method as defined in claim 15 in which the reaction is carried out in an inert organic solvent at a temperature between 10° and about 180° C. while distilling off the amine NHR'R'' formed.

References Cited in the file of this patent

FOREIGN PATENTS 130,374    Sweden _____ Dec. 19, 1950

OTHER REFERENCES

Gilman et al.: "Jour. Am. Chem. Soc.," vol. 72 (1950), pp. 3045–7.

Sommer et al.: "Jr. Am. Chem. Soc.," vol. 73 (1951), pp. 5130–34 (p. 5133 only needed).

Hendry et al.: "British Jour. of Pharmacology," vol. 6 (1951), pp. 357–410, page 370 only needed.